United States Patent
Wise et al.

(10) Patent No.: US 11,809,558 B2
(45) Date of Patent: Nov. 7, 2023

(54) HARDWARE SECURITY HARDENING FOR PROCESSOR DEVICES

(71) Applicant: ADVANCED MICRO DEVICES, INC., Santa Clara, CA (US)

(72) Inventors: Harry J. Wise, Orlando, FL (US); Alexander Fuad Ashkar, Orlando, FL (US); Manu Rastogi, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 136 days.

(21) Appl. No.: 17/032,969

(22) Filed: Sep. 25, 2020

(65) Prior Publication Data

US 2022/0100856 A1  Mar. 31, 2022

(51) Int. Cl.
| | |
|---|---|
| G06F 21/00 | (2013.01) |
| G06F 21/56 | (2013.01) |
| H04L 69/22 | (2022.01) |
| G06F 9/30 | (2018.01) |
| G06F 21/54 | (2013.01) |
| G06F 9/38 | (2018.01) |

(52) U.S. Cl.
CPC ........ G06F 21/566 (2013.01); G06F 9/30076 (2013.01); G06F 9/3802 (2013.01); G06F 21/54 (2013.01); G06F 21/567 (2013.01); H04L 69/22 (2013.01)

(58) Field of Classification Search
CPC ...... G06F 21/566; G06F 9/3802; G06F 21/54; G06F 9/30076; G06F 21/567; H04L 69/22

See application file for complete search history.

(56) References Cited

U.S. PATENT DOCUMENTS

| | | | |
|---|---|---|---|
| 5,717,909 A * | 2/1998 | Nemirovsky | G06F 11/3648 712/E9.055 |
| 9,632,784 B2 * | 4/2017 | Julier | G06F 9/3001 |
| 2007/0266229 A1 * | 11/2007 | Plondke | G06F 9/3853 712/241 |
| 2013/0239193 A1 * | 9/2013 | Bouchard | H04L 63/08 726/7 |
| 2015/0249603 A1 * | 9/2015 | Tompkins | H04L 47/34 370/392 |
| 2018/0068116 A1 * | 3/2018 | Benchaalal | H04L 9/004 |
| 2018/0082398 A1 * | 3/2018 | Ashkar | G06T 1/20 |
| 2018/0329823 A1 * | 11/2018 | Brekelbaum | G06F 3/06 |
| 2019/0018962 A1 * | 1/2019 | Desimone | H04L 63/1441 |

* cited by examiner

Primary Examiner — Michael M Lee

(57) ABSTRACT

A method of packet attribute confirmation includes receiving, at a command processor of a parallel processor, a command packet including a received packet attribute, such as a packet size, of the command packet. The command processor compares the received packet attribute of the command packet relative to an expected packet attribute of the command packet. The command processor passes one or more commands to a prefetch parser such that a summed total size of the one or more commands is equal to the received packet size of the command packet. The command processor passes, based at least on determining a match between the received packet size and the expected packet size, the received command packet to the prefetch parser. Otherwise, the command processor passes, based at least on determining a mismatch between the received packet size and the expected packet size, one or more no-operation instructions to the prefetch parser.

20 Claims, 4 Drawing Sheets

HARDWARE SECURITY HARDENING FOR PROCESSOR DEVICES

BACKGROUND

Malicious activities, including unauthorized access or subsequent unpermitted use of network resources and data, can cause harm to a network's software or hardware or to users of the network. As an example, a faulty or malicious design from one user could potentially cause a denial of service to other users if the configured logic causes one or more servers within a computing facility to malfunction (e.g., crash, hang, or reboot) or be denied network services. As another example, a faulty or malicious design from one user could potentially corrupt or read data from another user if the configured logic is able to read and/or write memory of the other user's memory space.

SUMMARY OF EMBODIMENTS

In addition to the embodiments described herein, examples of specific combinations are within the scope of the disclosure, some of which are detailed below.

Example 1: A method, comprising receiving, at a command processor of a parallel processor, a command packet including a received packet size of the command packet; comparing, by the command processor, the received packet size of the command packet relative to an expected packet size of the command packet; and passing, based at least in part on the comparing, one or more commands to a prefetch parser of the parallel processor such that a summed total size of the one or more commands is equal to the received packet size of the command packet.

Example 2: The method of example 1, further comprising determining, at the command processor, a match between the received packet size and the expected packet size; and passing, based at least in part on determining the match, the received command packet to the prefetch parser.

Example 3: The method of example 1, further comprising determining, at the command processor, a mismatch between the received packet size and the expected packet size; and passing, based at least in part on determining the mismatch, one or more no-operation instructions to the prefetch parser, wherein the summed total size of the one or more no-operation instructions matches the received packet size.

Example 4: The method of example 3, further comprising generating an interrupt signal instructing the command processor to prevent execution of the received command packet by the prefetch parser.

Example 5: The method of example 1, wherein receiving the command packet comprises fetching the command packet to a reorder queue of the command processor; and propagating, to a packet injector communicably positioned between the reorder queue and the prefetch parser, of a packet header specifying the received packet size and a jump table address associated with the command packet.

Example 6: The method of example 5, further comprising providing, from a jump table at the prefetch parser to the packet injector, the expected packet size based on the jump table address associated with the command packet.

Example 7: The method of example 5, further comprising determining, by the packet injector and prior to comparing the received packet size of the command packet relative to an expected packet size of the command packet, receipt of an amount of data at the reorder queue matching the received packet size as specified by the packet header.

Example 8: A parallel processor, comprising one or more parallel processing blocks having parallel processing resources; a command processor communicably coupled to the one or more parallel processing blocks, wherein the command processor is to receive a command packet including a received packet size of the command packet, and to compare the received packet size of the command packet relative to an expected packet size of the command packet; and a prefetch parser to receive, based at least in part on the comparing, one or more commands such that a summed total size of the one or more commands is equal to the received packet size of the command packet.

Example 9: The parallel processor of example 8, further comprising a reorder queue to receive the command packet from a command buffer.

Example 10: The parallel processor of example 9, further comprising a packet injector communicably positioned between the reorder queue and the prefetch parser, wherein the command processor is to propagate to the packet injector a packet header specifying the received packet size and a jump table address associated with the command packet.

Example 11: The parallel processor of example 10, wherein the prefetch parser includes a jump table, and further wherein the prefetch parser is to provide the expected packet size based on the jump table address associated with the command packet.

Example 12: The parallel processor of example 10, wherein the packet injector is to determine a match between the received packet size and the expected packet size, and further wherein the packet injector is to pass, based at least in part on determining the match, the received command packet to the prefetch parser.

Example 13: The parallel processor of example 10, wherein the packet injector is to determine a mismatch between the received packet size and the expected packet size, and further wherein the packet injector is to pass, based at least in part on determining the mismatch, one or more no-operation instructions to the prefetch parser, wherein the summed total size of the one or more no-operation instructions matches the received packet size.

Example 14: The parallel processor of example 13, wherein the packet injector is further to generate a parallel processor interrupt signal instructing the command processor to prevent execution of the received command packet by the prefetch parser.

Example 15: A system, comprising a host processor communicably coupled to a system memory module; a parallel processor communicably coupled to the system memory module, wherein the parallel processor includes a command processor configured to receive, from a command buffer at the system memory module, a command packet including a received packet size of the command packet, and further wherein the command processor is configured to compare the received packet size of the command packet relative to an expected packet size of the command packet; and a prefetch parser configured to receive, based at least in part on the comparing, one or more commands such that a summed total size of the one or more commands is equal to the received packet size of the command packet.

Example 16: The system of example 15, wherein the command processor further comprises a reorder queue to receive the command packet from a command buffer.

Example 17: The system of example 16, wherein the command processor further comprises a packet injector communicably positioned between the reorder queue and the prefetch parser, wherein the command processor is configured to propagate to the packet injector a packet header specifying the received packet size and a jump table address associated with the command packet.

Example 18: The system of example 17, wherein the prefetch parser includes a jump table, and further wherein the prefetch parser is configured to provide the expected packet size based on the jump table address associated with the command packet.

Example 19: The system of example 17, wherein the packet injector is configured to determine a match between the received packet size and the expected packet size, and further wherein the packet injector is configured to pass, based at least in part on determining the match, the received command packet to the prefetch parser.

Example 20: The system of example 17, wherein the packet injector is configured to determine a mismatch between the received packet size and the expected packet size, and further wherein the packet injector is configured to pass, based at least in part on determining the mismatch, one or more no-operation instructions to the prefetch parser, wherein the summed total size of the one or more no-operation instructions matches the received packet size.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Existing computing systems utilize a number of methods to protect against malicious programming attacks and/or data corruption from external sources. The ability to detect and recover from illegal programming sequences of packets, either by mistake or by malicious activity, is increasingly important for reliable network operation. However, it is often difficult to distinguish between malicious and legitimate communications prior to transmitting data to processors for execution. To improve overall system performance by detecting potentially problematic data packets prior to execution and to provide a mechanism for recovery from problematic data packets, the following disclosure describes systems and methods for providing hardware-based matching of distinctive packet attributes of a received command packet (e.g., during runtime) relative to expected command packet attributes (e.g., defined in microcode at assemble time) so as to provide for hardening of parallel processors against malicious programming aimed at instructing processors to perform unintended or undesirable operations, such as accessing private information.

In various embodiments, a method of packet attribute confirmation includes receiving, at a command processor of a parallel processor, a command packet including a received packet size of the command packet. The command processor compares the received packet size of the command packet relative to an expected packet size of the command packet. Further, the command processor passes one or more commands to a prefetch parser such that a summed total size of the one or more commands is equal to the received packet size of the command packet. The command processor passes, based at least on determining a match between the received packet size and the expected packet size, the received command packet to the prefetch parser. The command processor passes, based at least on determining a mismatch between the received packet size and the expected packet size, one or more no-operation instructions to the prefetch parser. In this manner, the command processor provides for execution of data packets that are at least not obviously malformed (e.g., of a differing size than expected, which may result from malicious data and/or incomplete fetching of data to the command processor) and that would result in execution at parallel processing units to become unsynchronized with application program command streams.

Figure 1:
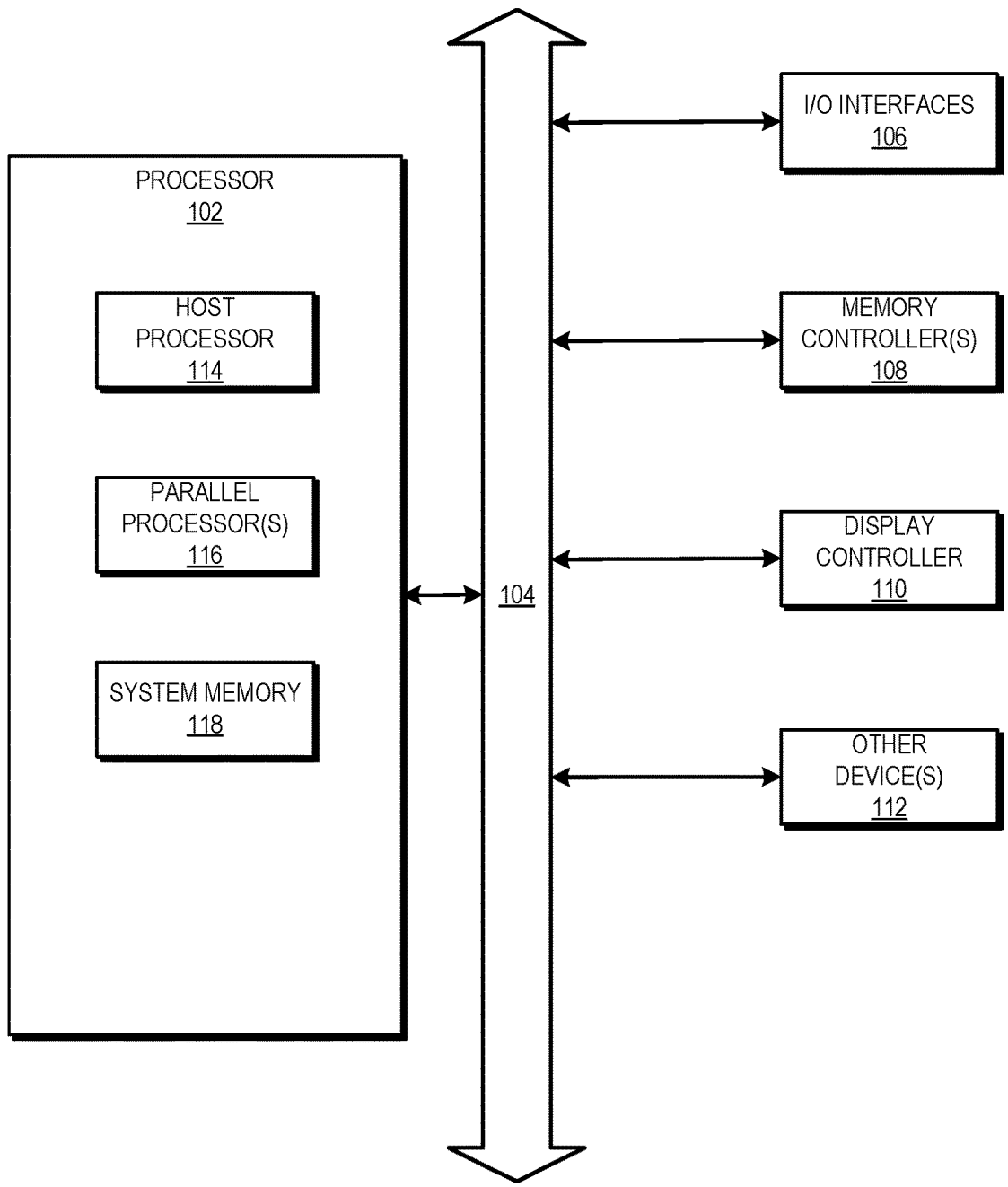
FIG. 1 is a block diagram of a processing system for performing packet attribute confirmation with parallel processors in accordance with some embodiments.

FIG. 1 illustrates a block diagram of a computing system 100 for performing packet attribute confirmation with parallel processors in accordance with some embodiments. In various embodiments, the computing system 100 includes at least one or more processors 102, fabric 104, input/output (I/O) interfaces 106, memory controller(s) 108, display controller 110, and other device(s) 112. In various embodiments, computing system 100 includes a computer, laptop, mobile device, server, or any of various other types of computing systems or devices. It is noted that the number of components of computing system 100 vary in some embodiments. It is also noted that in some embodiments computing system 100 includes other components not shown in FIG. 1. Additionally, in other embodiments, computing system 100 is be structured in other ways than shown in FIG. 1.

Fabric 104 is representative of any communication interconnect that complies with any of various types of protocols utilized for communicating among the components of the computing system 100. Fabric 104 provides the data paths, switches, routers, and other logic that connect the processors 102, I/O interfaces 106, memory controller(s) 108, display controller 110, and other device(s) 112 to each other. Fabric 104 handles the request, response, and data traffic, as well as probe traffic to facilitate coherency. Fabric 104 also handles interrupt request routing and configuration access paths to the various components of computing system 100. Additionally, fabric 104 handles configuration requests, responses, and configuration data traffic. In some embodiments, fabric 104 is bus-based, including shared bus configurations, crossbar configurations, and hierarchical buses with bridges. In other embodiments, fabric 104 is packet-based, and hierarchical with bridges, crossbar, point-to-point, or other interconnects. From the point of view of fabric 104, the other components of computing system 100 are referred to as "clients". Fabric 104 is configured to process requests generated by various clients and pass the requests on to other clients.

Memory controller(s) 108 are representative of any number and type of memory controllers coupled to any number and type of memory device(s). For example, the type of memory device(s) coupled to memory controller(s) 108 include Dynamic Random Access Memory (DRAM), Static Random Access Memory (SRAM), NAND Flash memory, NOR flash memory, Ferroelectric Random Access Memory (FeRAM), or others. Memory controller(s) 108 are accessible by processors 102, I/O interfaces 106, display controller 110, and other device(s) 112 via fabric 104. I/O interfaces 106 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 106. Such peripheral devices include (but are not limited to) displays, keyboards, mice, printers, scanners, joysticks or other types of game controllers, media recording devices, external storage devices, network interface cards, and so forth. Other device(s) 112 are representative of any number and type of devices (e.g., multimedia device, video codec).

In various embodiments, to support execution of instructions for graphics and other types of workloads, the one or more processors 102 includes a host processor 114, such as a central processing unit (CPU), one or more parallel processors 116 (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like), and a memory 118. Although for clarity the memory 118 is illustrated separately from the host processor 114 and the one or more parallel processors 116 in FIG. 1, in some embodiments the memory 118 is part of the host processor 114 and/or the one or more parallel processors 116 (e.g., part of the same integrated circuit die on which the one or more parallel processors 116 is implemented).

In various embodiments, the one or more parallel processors 116 are configured to be called by the host processor 114 via, for example, the fabric 104. Accordingly, as one example, graphics operations of a program being executed by the host processor 114 is passed to the one or more parallel processors 116 (e.g., a GPU) to processing. In some embodiments, the one or more processors 102 include additional modules, not illustrated in FIG. 1, to facilitate execution of instructions, including one or more additional processing units such as one or more additional central processing units (CPUs), additional GPUs, one or more digital signal processors and the like. In addition, in various embodiments, the one or more processors 102 include memory and input/output interface modules, such as a northbridge and a southbridge, additional memory to provide caches and other supporting memory structures for the processing units, and the like.

As described in more detail with respect to FIGS. 2-4 below, in various embodiments, the one or more parallel processors 116 perform packet attribute confirmation and passing only command packets determined to have a match between the received packet attribute(s) and the expected packet attribute(s) to a prefetch parser for command execution. It should be recognized that although the parallel processors 116 are described below the particular context of one or more GPUs for ease of illustration and description, in various embodiments, the packet attribute confirmation processes performed by the one or more parallel processors 116 is applicable to any of a variety of types of parallel processor without departing from the scope of this disclosure. The concepts of packet attribute confirmation for detecting potentially malicious packets prior to sending such packets to a command processor is similarly applicable to various other processors without departing from the scope of this disclosure. For example, in various embodiments, the concepts described here is also similarly applicable to other processors including accelerated processing units (APUs), discrete GPUs (dGPUs), artificial intelligence (AI) accelerators, other parallel processors, central processing units (CPUs), and the like.

Figure 2:
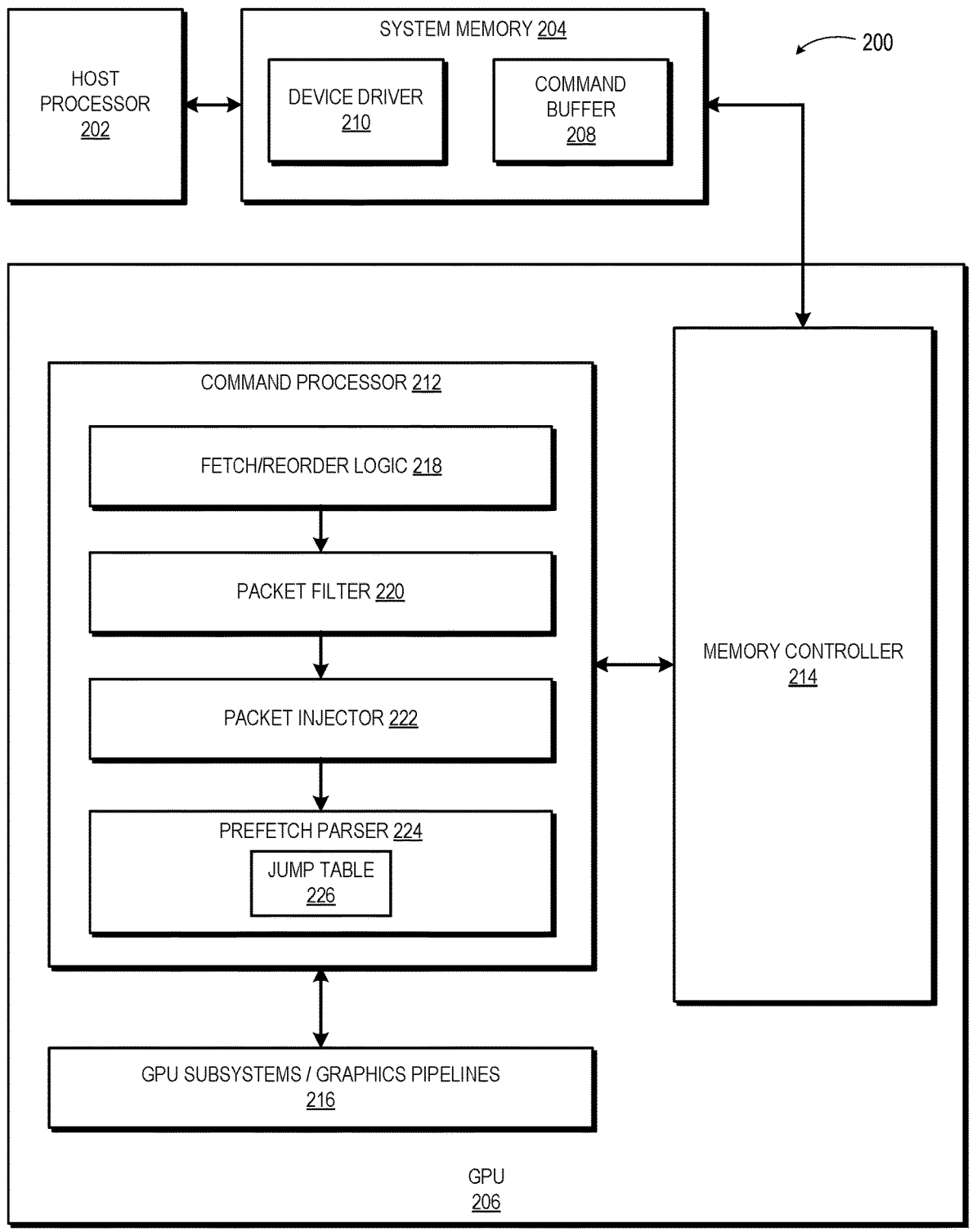
FIG. 2 is a block diagram of a processor that performs command packet attribute confirmation in accordance with some embodiments.

FIG. 2 is a block diagram of an implementation of a parallel processor that further illustrates additional details related to packet attribute confirmation at a GPU in accordance with some embodiments. As shown, the system 200 includes at least a host processor 202, a system memory 204, and a GPU 206. In various embodiments, the host processor 202, the system memory 204, and the GPU 206 is implemented as previously described with respect to FIG. 1. Those skilled in the art will appreciate that system 200 also includes other components which are not shown to avoid obscuring the figure. For example, in various embodiments, the system 200 includes additional components such as software, hardware, and firmware components in addition to, or different from, that shown in FIG. 2. In various embodiments, the GPU 206 includes other components, omits one or more of the illustrated components, has multiple instances of a component even if only one instance is shown in FIG. 2, and/or is organized in other suitable manners.

In various embodiments, the system 200 executes any of various types of software applications. In some embodiments, as part of executing a software application (not shown), the host processor 202 of system 200 launches tasks to be executed at the GPU 206. For example, when a software application executing at the host processor 202 requires graphics processing, the host processor 202 provides graphics commands and graphics data in a command buffer 208 in the system memory 204 for subsequent receival and processing by the GPU 206. In various embodiments, a device driver 210 writes command packets with commands corresponding to one or more tasks. The commands include draw commands, global state updates, block state updates, and the like.

In various embodiments, the device driver 210 includes software, firmware, hardware, or any combination thereof. In various embodiments, the device driver 210 is implemented entirely in software. The device driver 210 provides an interface and/or application programming interface (API) for communications access to the GPU 206 and access to hardware resources of the GPU 206. Those skilled in the art will recognize the packet attribute confirmation concepts described herein are applicable to all types of processing with packets generated by device drivers 210, such as kernel mode drivers, user mode drivers, and the like.

As previously noted, the system memory 204 includes one or more memory buffers (including the command buffer 208) through which the host processor 202 communicates (e.g., provided via the device driver 210) commands to the GPU 206. In various embodiments, such memory buffers are implemented as queues, ring buffers or other data structures suitable for efficient queuing of work items or command packets. In the instance of a queue, command packets are placed into and taken. In various embodiments, the system memory 204 includes indirect buffers that hold the actual commands (e.g., instructions, data, pointers non-pointers, and the like). For example, in some embodiments, when the host processor 202 communicates a command packet (not shown) to the GPU 206, the command packet is stored in the indirect buffer and a pointer to that indirect buffer is inserted in one or more entries (that store commands, data, or associated contexts) of the command buffer 208.

In various embodiments, the GPU 206 includes one or more processors such as one or more command processors (CP) 212 for receiving command packets, a memory controller 214, and one or more GPU subsystems 216. In various embodiments, the one or more GPU subsystems 216 include various processing blocks and/or GPU compute resources. As used herein, the term "block" refers to a module included in an ASIC, an execution pipeline of a CPU, and/or a graphics pipeline of a GPU. Such a module includes, but is not limited to, a cache memory, an arithmetic logic unit, a multiply/divide unit, a floating point unit, a geometry shader, a vertex shader, a pixel shader, various other shaders, a clipping unit, a z-buffer (e.g., depth buffer), a color buffer, or some other processing module as would be apparent to a person skilled in the relevant art(s).

In various embodiments, the command processor 212 is used as a controller for fetching command packets from the command buffer 208 and for coordinating processing of the received command packets at compute resources of the GPU 206, such as the one or more GPU subsystems 216 (e.g., graphics pipelines). For example, in some embodiments, the memory controller 214 at the GPU 206 accesses the command group and state information stored at the command buffer 208 (e.g., in the form of a command packet stream) and manages flow of data to and from various memory elements of the system 200. The command processor 212 uses interfaces (not shown) to the memory controller 214 for accessing the command packets and for coordinating execution (e.g., issuing tasks corresponding to the command packets) of those commands at the compute resources (e.g., one or more graphics pipelines) of the GPU 206. In various embodiments, the command processor 212 is implemented in hardware, firmware, or software, or a combination thereof. In one embodiment, the command processor 212 is implemented as a reduced instruction set computer (RISC) engine with microcode for implementing logic including scheduling logic.

As illustrated, the command processor 212 includes a packet fetcher and reorder queue logic 218 that is used to fetch command packets and, in the case of out-of-order processing, to reorder packets, at a reorder queue (not shown) in program order if necessary. The packet fetcher and reorder queue logic 218 provides command packets to a hardware packet filter 220 that is implemented in hard-coded logic, programmable logic, or a combination thereof. In various embodiments, the packet filter 220 is configured to filter command packets based on a comparison of hardware state information included in the packets and a list of values that represent previously received hardware state information that has been used to configure the GPU 206. Hardware state information includes, for example, configuration data, addresses of destinations of the configuration data such as register data, group identifiers, or hashes of various combinations of the configuration data, addresses, or group identifiers. Some embodiments of the hardware state information list are implemented as a cache or a content-addressable memory (CAM). In various embodiments, filtering the commands packets in the packet stream to remove redundant packets that include previously received hardware state information before providing the packets to, for example, downstream components of the command processor 212, such as a packet injector 222, and/or a prefetch parser 224.

As previously discussed, the command processor 212 receives tasks (e.g., graphics processing and general compute tasks) from one or more command buffers 208 in the form of command packets. The command packets (not shown in FIG. 2) are fetched to a reorder queue at the packet fetcher and reorder queue logic 218, which thereby contains raw data sent by software, such as the device driver 210, that typically instruct the GPU 206 to write register states and/or launch draws or dispatches down a graphics pipeline. However, GPUs conventionally do not have insight as to the contents of the raw data of command packets, which may or may not have malicious or bad programming (with the execution of such problem packets likely to result in hangs or other GPU malfunctions).

To facilitate the detection of potentially problematic command packets prior to execution of the packets, the command processor 212 includes a packet injector 222 positioned between the reorder queue (not shown) associated with the packet fetcher/reorder queue logic 218 and a prefetch parser 224. In various embodiments, the prefetch parser 224 includes an embedded jump table 226. The jump table 226 is an assembled, precompiled lookup table that instructs the prefetch parser 224 where to move an instruction pointer when it sees a particular packet type (e.g., an index instructing the command processor where to go in micro-code). Additionally, as described in more detail below with respect to FIG. 3, the jump table 226 also includes information associated with each jump address that informs regarding an expected packet attribute for that given packet for a given jump address and which opcodes are valid.

In various embodiments, the packet injector 222 includes hardware/logic that is configured to compare the expected packet size (as provided by the jump table 226, such packet size information defined in microcode and programmed into the jump table 226 hardware at assemble time) against a size of the incoming packet fetched by the command processor 212 (referred to as the 'received packet size'). If the received packet size does not match the expected size, the packet injector 222 prevents injection of the packet of unexpected size to the prefetch parser 224, as microcode execution will not match with the stream of packet data sent to it (and will likely result in a hang). The packet injector 222 determines receipt of a full good packet prior to sending command packets to the prefetch parser 224 based on a match between the received packet size of the incoming packet and the expected packet size.

It should be recognized that although various embodiments of packet attribute confirmation are described here in the context of comparing expected packet sizes to received packet sizes for ease of description, those skilled in the art will recognize that one or more of various distinctive attributes of a packet may be compared in conjunction with or in place of packet size as the basis for packet attribute confirmation. For example, in some embodiments, the packet injector 222 compares a received packet size relative to a minimum packet size for variable length packets to ensure that the received packet size is at least the minimum packet size. In other words, receiving a packet having a received packet size less than the minimum variable packet size indicates receipt of a bad packet.

The prefetch parser 224, based on confirmation by the packet injector 222 that the incoming packet is of an expected size, transmits instructions to begin prefetching the command packet. The prefetch parser 224 is thus provided with a command packet that is at least guaranteed to be of an expected size and subsequently uses the configuration data in the packets of the packet stream to configure the GPU subsystems 216, other components of the GPU 206, and the like. For example, in some embodiments, the prefetch parser 224 uses the configuration data in the packets and the destination addresses associated with the configuration data to configure the values of registers that determine the operating state of the GPU 206. In various embodiments, the prefetch parser 224 also provides other packets, such as data or instructions that are used for rendering images.

Figure 3:
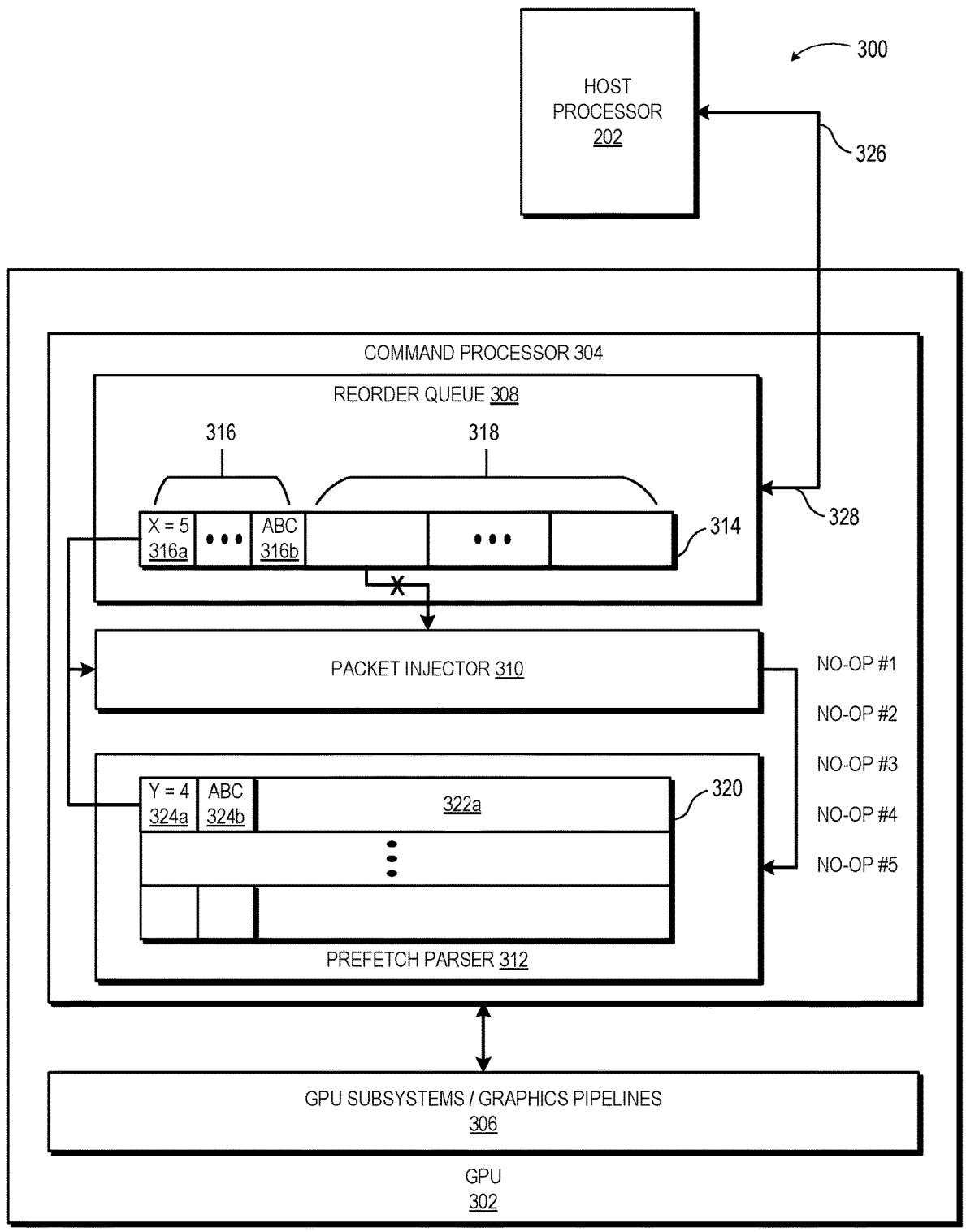
FIG. 3 is a block diagram illustrating an example of command packet size confirmation and error recovery at a processor in accordance with some embodiments.

Referring now to FIG. 3 and with continued reference to FIG. 2, a block diagram of packet size confirmation and error recovery at a GPU is illustrated in accordance with some embodiments. As shown, a system 300 includes a GPU 302 having a command processor 304 for receiving command packets and one or more GPU subsystems, illustrated as a graphics pipeline 306. Those skilled in the art will appreciate that the GPU 302 also includes other components which are not shown to avoid obscuring the figure, such as previously discussed with respect to GPU 206 of FIG. 2.

The command processor 304 includes a reorder queue 308, a packet injector 310, and a prefetch parser 312. In various embodiments, unparsed command packets are received out of order from cache or memory and are stored in reorder queue 308 (e.g., based on the operations of packet fetcher and reorder queue logic 218 of FIG. 2). As will be appreciated by those skilled in the art, data packets, in general, have a header portion and a data portion. The header portion typically comprises data fields of standard digital form and length that identify such things as the packet type, the source, and the destination. A packet processor then knows the type and flow for a packet by referencing the header fields.

As illustrated, a command packet 314 is received at the reorder queue 308 of the command processor 304. In various embodiments, an example command packet format includes a packet header portion 316 including one or more header data fields and a packet data portion 318 including one or more data fields (e.g., often referred to as the 'payload' of the command packet 314). In some embodiments, a first data field of the packet header portion 316a specifies a size of the received command packet 314 (e.g., length of the command packet 314 in DWORDS). In some embodiments, a second data field of the packet header portion 316b indicates a write/read address associated with the command packet 314. As shown, the first data field of the packet header portion 316a indicates that the command packet 314 has a size of X=5 DWORDS (i.e., the received packet size of received command packet 314 is 5 data elements of 32-bit DWORDS) and the second data field of the packet header portion 316b indicates that the command packet 314 is associated with address 'ABC'. It should be noted that the example command packet format, fields, and DWORD data type described herein are provided for context purposes only and any data packet format with any number and arrangement of data fields (and any data type along with their respective data structure sizes) may be used without departing from the scope of this disclosure.

In various embodiments, the command processor 304 includes a combination of dedicated, fixed function hardware for command processing and software program-based execution. For example, in some embodiments, the command processor 304 is associated with a set of microcode, as well as a micro-engine (ME) or other execution engine that executes a sequence of microcode that is loaded by, for example, a device driver (e.g., device driver 210 of FIG. 2) as part of an initialization step into the command processor 304 hardware at assemble time. The microcode determines what code is executed for a command packet (for example, via a jump table 320 based on an OPCODE), and it also includes the sequence of operations or code executed in order to interpret the data in the command. Such a jump table 320 is similarly built during initialization procedures and contains, for example, information with respect to valid opcodes, the address locations through which the command processor 304 executes commands, and the like.

As shown, the jump table 320 at the prefetch parser 312 includes a number of jump table entries 322. The example jump table format includes a first data field 324a specifying an expected packet size (e.g., length of a command packet in DWORDS) for commands packets associated with the address of a second data field 324b in the jump table entries 322. In particular, as defined by microcode and programmed into the jump table 320, command packets associated with address 'ABC' have an expected packet size of Y=4 DWORDS. Accordingly, the microcode-based command processor 304 will always assume there is 4 DWORDS in the raw data of a command packet with an address header field indicating address 'ABC'. However, due to the received command packet 314 having a length of 5 DWORDS, the microcode would be out of sync with the received command.

To prevent execution of known bad command packets, the packet injector 310 performs a comparison check of the size of the incoming, received command packet 314 (e.g., X=5 DWORDS) against the expected packet size for commands to address 'ABC' as supplied by the device driver (e.g., embodied in jump table 320 and having expected packet size Y=4 DWORDS). Based on the packet injector 310 detecting this mismatch of the expected versus received packet sizes (or other packet/jump table values provided to the packet injector 310 from the jump table 320, such as reserved bits that are expected to be zero), the packet injector 310 holds the command packet 314 (e.g., not inject the command packet 314 to the prefetch parser 312) and generates an interrupt signal 326 to the host processor 202 indicating receipt of a bad packet by the command processor 304.

In various embodiments, the packet injector 310 at the command processor 304 generates an exception which halts execution of the GPU 302. The command processor 304 raises the interrupt signal 326 so that software is notified that the packet injector 310/prefetch processor has detected an error in the command buffer 208. This prevents processing of the detected bad packet (i.e., received command packet 314), which may have bad or incomplete data, and prevents causing the command processor 304/GPU 302 to fall out of synchronization with the program stream. In this manner, the command processor 304/GPU 302 remains in a good state (as opposed to performing a reset sequence of graphics pipeline reset sequences after the device driver is notified of a malfunction resulting from executing the bad command packet 314 to recover the GPU 302).

To recover from the interrupt signal 326, the packet injector 310 waits for receipt of a pipeline request signal 328 (e.g., as an acknowledgement signal from the host processor 202 to which the interrupt signal 326 was sent) to begin a reset sequence as a safer way to recover from a fatal type of error (e.g., a hang that may affect other graphics pipelines and would necessitate having to reset the whole chip). A micro-engine includes the ability to ignore a programmable number of data elements (e.g., 32-bit DWORDs in a command buffer) by treating these as NOPs (non-operations, or no operation). In various embodiments, rather than injecting the bad command packet 314 to the prefetch parser and thus providing the malformed command packet 314 to the prefetch parser 224 (e.g., resulting in the information stored in the malformed command packet 314 corrupting GPU state information), the packet injector 310 passes one or more NOP headers to the prefetch parser 312. In particular, in response to receiving the pipeline request signal 328, the packet injector 310 passes a NOP header 330 to the prefetch parser 312 for each DWORD of the malformed command packet 314.

Thus, rather than send a bad packet header, the packet injector 310 instructs the prefetch parser 312 to perform no-ops and allowing the indirect buffer is consumed without the prefetch parser 312 seeing any malformed packets. It should be noted that the malformed command packet 314 is not discarded per se; rather, the packet injector 310 converts the packet type to NOPs that are not executed. That is, the packet injector 310 replaces data corresponding to malformed command packets 314 seen by the reorder queue 308 and replacing malformed command packets with no-op DWORDS, thereby preventing corruption of the state information due to malicious intent or accidental intent of bad packets. Further, in this manner, the packet injector 310 ensures receipt of a full good packet before sending command packets to the PFP 312.

Figure 4:
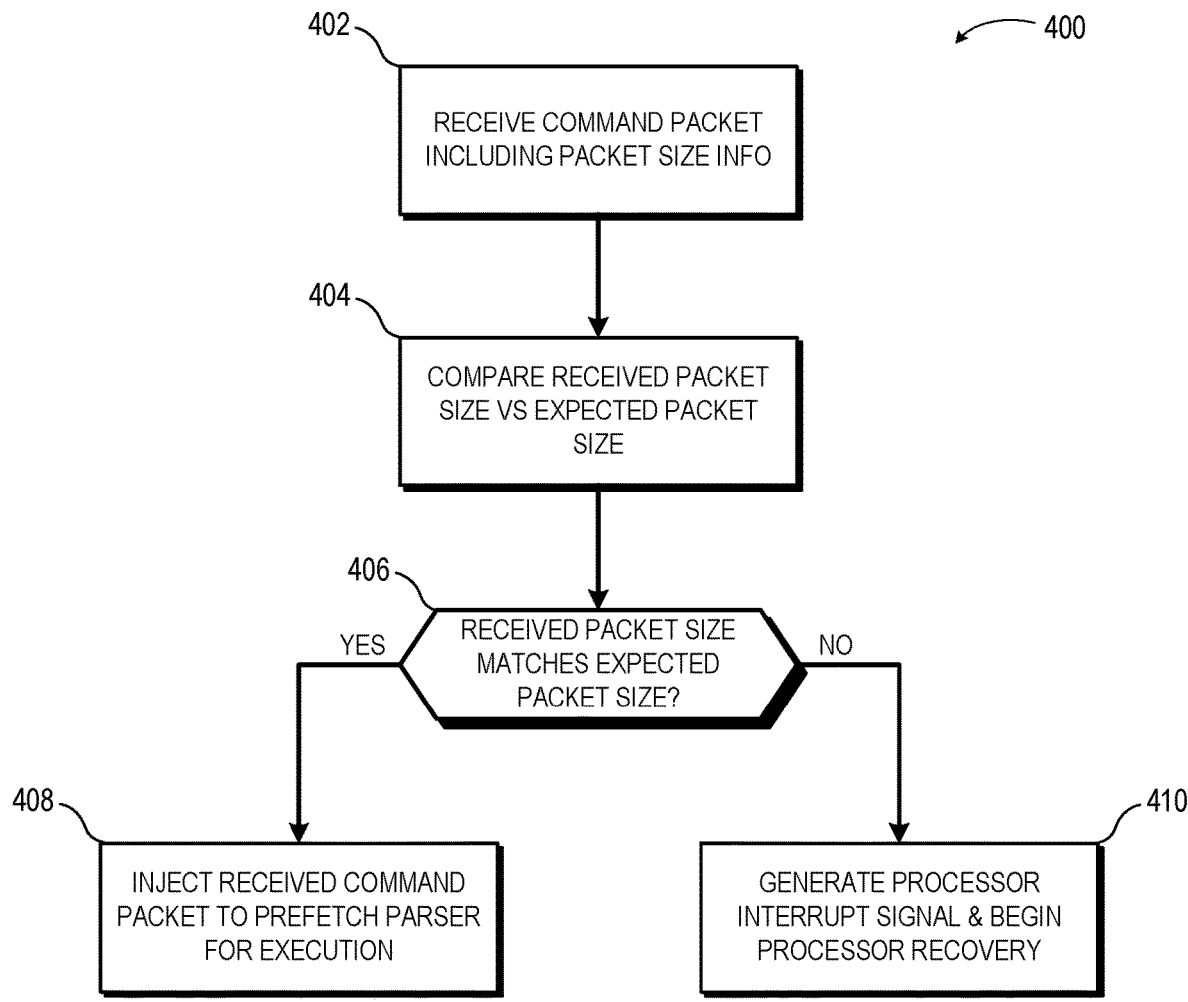
FIG. 4 is a flow diagram of a method of packet attribute confirmation and error recovery at a processor in accordance with some embodiments.

FIG. 4 is a block diagram of a method 400 of command packet attribute confirmation and error recovery at a GPU in accordance with some embodiments. For ease of illustration and description, the method 400 is described below with reference to and in an example context of the systems 100 and 200 of FIG. 1 and FIG. 2, and the GPU 302 of FIG. 3. However, the method 400 is not limited to these example contexts, but instead in different embodiments is employed for any of a variety of possible system configurations using the guidelines provided herein.

The method beings at block 402 with the receiving, at a command processor of a parallel processor, of a command packet (or other data packet) including received packet size info for coordinating processing of the received command packets at compute resources of the parallel processor. In various embodiments, such as described with respect to FIGS. 2 and 3, command packets are fetched to a reorder queue at the packet fetcher and reorder queue logic 218, which thereby contains raw data sent by software, such as the device driver 210, that typically instruct the GPU 206 to write register states and/or launch draws or dispatches down a graphics pipeline.

As illustrated, a command packet 314 is received at the reorder queue 308 of the command processor 304. In various embodiments, the command packet format includes a packet header portion 316 including one or more header data fields and a packet data portion 318 including one or more data fields (e.g., often referred to as the 'payload' of the command packet 314). In some embodiments, a first data field of the packet header portion 316a specifies a size of the received command packet 314 (e.g., length of the command packet 314 in DWORDS). In some embodiments, a second data field of the packet header portion 316b indicates a write/read address associated with the command packet 314. As shown, the first data field of the packet header portion 316a indicates that the command packet 314 has a size of X=5 DWORDS (i.e., the received packet size of received command packet 314 is 5 DWORDS) and the second data field of the packet header portion 316b indicates that the command packet 314 is associated with address 'ABC'.

Similarly, as previously described above, the jump table 320 at the prefetch parser 312 includes a number of jump table entries 322. The example jump table format includes a first data field 324a specifying an expected packet size (e.g., length of a command packet in DWORDS) for commands packets associated with the address of a second data field 324b in the jump table entries 322. In particular, as defined by microcode and programmed into the jump table 320, command packets associated with address 'ABC' have an expected packet size of Y=4 DWORDS. Accordingly, the microcode-based command processor 304 will always assume there is 4 DWORDS in the raw data of a command packet with an address header field indicating address 'ABC'.

At block 404, and as previously described with respect to FIG. 2, a packet injector compares an expected packet size (as provided by the jump table 226, such packet size information defined in microcode and programmed into the jump table 226 hardware at assemble time) against a size of the incoming packet fetched by the command processor 212 (referred to as the 'received packet size'). For example, such as illustrated in FIG. 3, the packet injector 310 performs a comparison check of the size of the incoming, received command packet 314 (e.g., X=5 DWORDS) against the expected packet size for commands to address 'ABC' as supplied by the device driver (e.g., embodied in jump table 320 and having expected packet size Y=4 DWORDS).

It should be recognized that although various embodiments of packet attribute confirmation are described here in the context of comparing expected packet sizes to received packet sizes for ease of description, those skilled in the art will recognize that one or more of various distinctive attributes of a packet may be compared in conjunction with or in place of fixed packet size as the basis for packet attribute confirmation. For example, in some embodiments, the operations of block 404 includes comparing a received packet size relative to a minimum packet size for variable length packets to ensure that the received packet size is at least the minimum packet size. In other words, receiving a packet having a received packet size less than the minimum variable packet size indicates receipt of a bad packet.

At block 406, the packet injector compares the expected packet size relative to the received packet size and proceeds to block 408 in response to determining that the expected packet size matches the received packet size. At block 408, such as previously described with respect to FIG. 2, the packet injector 222 determines receipt of a full good packet and then sends a command packet to the prefetch parser 224 based on a match between the received packet size of the incoming packet and the expected packet size. In various embodiments, the operations of block 408 also include the prefetch parser 224 transmitting, based on confirmation by the packet injector 222 that the incoming packet is of an expected size, instructions to begin prefetching the command packet. The prefetch parser 224 is thus provided with a command packet that is at least guaranteed to be of an expected size and subsequently uses the configuration data in the packets of the packet stream to configure the GPU subsystems 216, other components of the GPU 206, and the like. For example, in some embodiments, the prefetch parser 224 uses the configuration data in the packets and the destination addresses associated with the configuration data to configure the values of registers that determine the operating state of the GPU 206.

Alternatively, at block 406, the packet injector compares the expected packet size relative to the received packet size and proceeds to block 410 in response to determining a mismatch between the expected packet size and the received packet size. At block 410, in response to detecting a mismatch of the expected versus received packet sizes (or other packet/jump table values provided to the packet injector, such as reserved bits that are expected to be zero), the packet injector generates a processor interrupt signal and begins processor recovery operations. In various embodiments, such as previously described with respect to FIG. 3, the packet injector 310 holds the command packet 314 (e.g., not inject the command packet 314 to the prefetch parser 312) and generates an interrupt signal 326 to the host processor 202 indicating receipt of a bad packet by the command processor 304.

At block 410, the packet injector 310 at the command processor 304 generates an exception which halts execution of the GPU 302. The command processor 304 raises the interrupt signal 326 so that software is notified that the packet injector 310/prefetch processor has detected an error in the command buffer 208. This prevents processing of the detected bad packet (i.e., received command packet 314), which may have bad or incomplete data, and prevents causing the command processor 304/GPU 302 to fall out of synchronization with the program stream. In this manner, the command processor 304/GPU 302 remains in a good state (as opposed to performing a reset sequence of graphics pipeline reset sequences after the device driver is notified of a malfunction resulting from executing the bad command packet 314 to recover the GPU 302).

At block 410, to recover from the interrupt signal 326, the packet injector 310 waits for receipt of a pipeline request signal 328 (e.g., as an acknowledgement signal from the host processor 202 to which the interrupt signal 326 was sent) to begin a reset sequence as a safer way to recover from a fatal type of error (e.g., a hang that may affect other graphics pipelines and would necessitate having to reset the whole chip). As understood by those skilled in the art, a microengine includes the ability to ignore a programmable number of data elements (e.g., 32-bit DWORDs in a command buffer) by treating these as NOPs (non-operations, or no operation). In various embodiments, rather than injecting the bad command packet 314 to the prefetch parser and thus providing the malformed command packet 314 to the prefetch parser 312 (e.g., resulting in the information stored in the malformed command packet 314 corrupting GPU state information), the packet injector 310 passes one or more NOP headers to the prefetch parser 312. In particular, in response to receiving the pipeline request signal 328, the packet injector 310 passes a NOP header 330 to the prefetch parser 312 for each DWORD of the malformed command packet 314.

Thus, rather than send a bad packet header, the packet injector 310 instructs the prefetch parser 312 to perform no-ops and allowing the indirect buffer is consumed without the prefetch parser 312 seeing any malformed packets. It should be noted that the malformed command packet 314 is not discarded per se; rather, the packet injector 310 converts the packet type to NOPs that are not executed by inserting NOPs to the prefetch parser 312 instead of bad packet data. That is, the packet injector 310 replaces data corresponding to malformed command packets 314 seen by the reorder queue 308 and replacing malformed command packets with no-op DWORDS, thereby preventing corruption of the state information due to malicious intent or accidental intent of bad packets. Further, in this manner, the packet injector 310 ensures receipt of a full good packet before sending command packets to the PFP 312.

Accordingly, as described herein, the hardware-based matching of a received command packet size (e.g., during runtime) relative to the expected command packet size (e.g., defined in microcode at assemble time) provides for hardening of parallel processors against malicious programming aimed at instructing processors to perform unintended or undesirable operations, such as accessing private information. This is particularly applicable in cloud computing systems where relatively few numbers of hardware devices may support various virtual machines (e.g., multiple applications on a single machine via GPU virtualization). Even with each virtual machine having a unique virtual machine identifier (VMID), a single user has the capability to transmit bad packets and bring down large portions of the cloud computing system, such as by hanging a whole physical machine (e.g., a single bad packet on one virtual machine can hang the whole physical machine). Thus, the ability to detect erroneous commands (intended or otherwise) allows for increased system/network resiliency against malicious users or mistaken activity by users that have the potential to crash subsets or entireties of processing systems and networks.

A computer-readable storage medium includes any non-transitory storage medium, or combination of non-transitory storage media, accessible by a computer system during use to provide instructions and/or data to the computer system. Such storage media include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software include the instructions and certain data that, when executed by the one or more processors, manipulate the one or more processors to perform one or more aspects of the techniques described above. The non-transitory computer-readable storage medium include, for example, a magnetic or optical disk storage device, solid state storage devices such as Flash memory, a cache, random access memory (RAM) or other non-volatile memory device or devices, and the like. The executable instructions stored on the non-transitory computer-readable storage medium include source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
coordinating, by a command processor of a parallel processor, execution of a command packet by issuing tasks corresponding to the command packet to one or more compute resources, the command packet including a received packet size of the command packet;
comparing, by the command processor, the received packet size of the command packet relative to an expected packet size of the command packet; and
passing, based at least in part on the comparing, one or more commands to a prefetch parser of the parallel processor, wherein a summed total size of the one or more commands is equal to the received packet size of the command packet.

2. The method of claim 1, further comprising:
determining, at the command processor, a match between the received packet size and the expected packet size; and
passing, based at least in part on determining the match, the received command packet to the prefetch parser.

3. The method of claim 1, further comprising:
determining, at the command processor, a mismatch between the received packet size and the expected packet size; and
passing, based at least in part on determining the mismatch, one or more no-operation instructions to the prefetch parser, wherein a summed total size of the one or more no-operation instructions matches the received packet size.

4. The method of claim 3, further comprising:
generating an interrupt signal instructing the command processor to prevent execution of the received command packet by the prefetch parser.

5. The method of claim 1, further comprising:
fetching the command packet to a reorder queue of the command processor; and
propagating, to a packet injector communicably positioned between the reorder queue and the prefetch parser, of a packet header specifying the received packet size and a jump table address associated with the command packet.

6. The method of claim 5, further comprising:
providing, from a jump table at the prefetch parser to the packet injector, the expected packet size based on the jump table address associated with the command packet.

7. The method of claim 5, further comprising:
determining, by the packet injector and prior to comparing the received packet size of the command packet relative to the expected packet size of the command packet, receipt of an amount of data at the reorder queue matching the received packet size as specified by the packet header.

8. A parallel processor, comprising:
one or more parallel processing blocks having parallel processing resources comprising at least one hardware resource;
a command processor communicably coupled to the one or more parallel processing blocks, wherein the command processor is to coordinate execution of a command packet by issuing tasks corresponding to the command packet to one or more compute resources, and is further to receive the command packet including a received packet size of the command packet, and to compare the received packet size of the command packet relative to an expected packet size of the command packet; and
a prefetch parser to receive, based at least in part on the comparing, one or more commands having a summed total size equal to the received packet size of the command packet.

9. The parallel processor of claim 8, further comprising:
a reorder queue to receive the command packet from a command buffer.

10. The parallel processor of claim 9, further comprising:
a packet injector communicably positioned between the reorder queue and the prefetch parser, wherein the command processor is to propagate to the packet injector a packet header specifying the received packet size and a jump table address associated with the command packet.

11. The parallel processor of claim 10, wherein the prefetch parser includes a jump table, and further wherein the prefetch parser is to provide the expected packet size based on the jump table address associated with the command packet.

12. The parallel processor of claim 10, wherein the packet injector is to determine a match between the received packet size and the expected packet size, and further wherein the packet injector is to pass, based at least in part on determining the match, the received command packet to the prefetch parser.

13. The parallel processor of claim 10, wherein the packet injector is to determine a mismatch between the received packet size and the expected packet size, and further wherein the packet injector is to pass, based at least in part on determining the mismatch, one or more no-operation instructions to the prefetch parser, wherein a summed total size of the one or more no-operation instructions matches the received packet size.

14. The parallel processor of claim 13, wherein the packet injector is further to generate a parallel processor interrupt signal instructing the command processor to prevent execution of the received command packet by the prefetch parser.

15. A system, comprising:
a host processor communicably coupled to a system memory module;
a parallel processor communicably coupled to the system memory module, wherein the parallel processor includes:
a command processor configured to coordinate execution of a command packet by issuing tasks corresponding to the command packet to one or more compute resources, and is further to receive, from a command buffer at the system memory module, the command packet including a received packet size of the command packet, and further wherein the command processor is configured to compare the received packet size of the command packet relative to an expected packet size of the command packet; and a prefetch parser configured to receive, based at least in part on the comparing, one or more commands having a summed total size equal to the received packet size of the command packet.

16. The system of claim 15, wherein the command processor further comprises:

a reorder queue to receive the command packet from the command buffer.

17. The system of claim 16, wherein the command processor further comprises:

a packet injector communicably positioned between the reorder queue and the prefetch parser, wherein the command processor is configured to propagate to the packet injector a packet header specifying the received packet size and a jump table address associated with the command packet.

18. The system of claim 17, wherein the prefetch parser includes a jump table, and further wherein the prefetch parser is configured to provide the expected packet size based on the jump table address associated with the command packet.

19. The system of claim 17, wherein the packet injector is configured to determine a match between the received packet size and the expected packet size, and further wherein the packet injector is configured to pass, based at least in part on determining the match, the received command packet to the prefetch parser.

20. The system of claim 17, wherein the packet injector is configured to determine a mismatch between the received packet size and the expected packet size, and further wherein the packet injector is configured to pass, based at least in part on determining the mismatch, one or more no-operation instructions to the prefetch parser, wherein a summed total size of the one or more no-operation instructions matches the received packet size.

* * * * *